(12) United States Patent
Mallary

(10) Patent No.: US 6,351,436 B1
(45) Date of Patent: Feb. 26, 2002

(54) FIELD ENHANCING MAGNETIC POLE FOR MAGNETO-OPTICAL RECORDING AND REPRODUCING DEVICE

(75) Inventor: Michael Mallary, Berlin, MA (US)

(73) Assignee: Maxtor Corporation, Longmont, CO (US)

(*) Notice: Subject to any disclaimer, the term of this patent is extended or adjusted under 35 U.S.C. 154(b) by 0 days.

(21) Appl. No.: 09/075,858

(22) Filed: May 11, 1998

(51) Int. Cl.[7] ............................................... G11B 11/00
(52) U.S. Cl. ......................................... 369/13; 361/114
(58) Field of Search ............................. 369/13, 14, 112, 369/44.14, 44.15; 360/114, 59

(56) References Cited

U.S. PATENT DOCUMENTS

| | | | |
|---|---|---|---|
| 4,890,178 A | * 12/1989 | Ichihara | 360/114 |
| 5,105,408 A | * 4/1992 | Lee et al. | 369/44.15 |
| 5,124,961 A | * 6/1992 | Yamaguchi et al. | 369/13 |
| 5,125,750 A | * 6/1992 | Corle et al. | 359/819 |
| 5,197,050 A | * 3/1993 | Murakami et al. | 369/13 |
| 5,295,122 A | * 3/1994 | Murakami et al. | 369/13 |
| 5,497,359 A | * 3/1996 | Maimin et al. | 369/44.15 |
| 5,729,393 A | * 3/1998 | Lee et al. | 359/819 |
| 5,886,959 A | * 3/1999 | Bischoff et al. | 369/13 |

* cited by examiner

Primary Examiner—Tan Dinh
(74) Attorney, Agent, or Firm—David M. Sigmond

(57) ABSTRACT

A flying optical head assembly for a magneto-optical data storage device includes a slider body mounting an optical element having a narrowed optical aperture extending through a location of the slider body, a recessed region surrounding the location passing the optical aperture, a magnetic pole sheet layer for heat dissipation and reduced magnetic reluctance formed in the recessed region and having an insulation layer and an opening for the optical aperture, and a magnetic bias coil formed on the insulation layer and surrounding the narrowed optical aperture. When formed of electrically conductive material, the sheet layer includes at least one radial slot for preventing a single turn short circuit in direct proximity to the coil. Multiple slots are preferred for bonding and to reduce eddy currents.

20 Claims, 2 Drawing Sheets

FIELD ENHANCING MAGNETIC POLE FOR MAGNETO-OPTICAL RECORDING AND REPRODUCING DEVICE

FIELD OF THE INVENTION

This invention relates generally to head design for an optical data storage system. More particularly, the present invention relates to a flying head assembly carrying e.g., a solid immersion lens having a light-beam mesa surrounded by a thin film electromagnetic coil and a field enhancing pole structure for concentrating the electromagnetic flux from the coil toward an underlying storage location of a magneto-optical storage medium over which the flying head assembly is passing for data storage and retrieval. The pole structure may also perform a thermal spreading function in order to remove heat from the mesa and coil, and medium adjacent thereto.

BACKGROUND OF THE INVENTION

New optical recording technologies, such as near field recording, require that an optical element, such as a solid immersion lens ("SIL"), present an optical aperture in very close proximity to an optical medium. Accordingly, placing the SIL onto a slider body which flies above a storage medium upon an air bearing achieves desired proximity. Examples of air bearing slider bodies are provided by U.S. Pat. No. 5,497,359 to Mamin et al., entitled: "Optical Disk Data Storage System with Radiation-Transparent Air-Bearing Slider", and U.S. Pat. No. 5,729,393 to Lee et al., entitled: "Optical Flying Head with Solid Immersion Lens having Raised Central Surface Facing Medium", the disclosures thereof being incorporated herein by reference.

Rewritable optical storage may be implemented with phase change media, and it may be implemented with magneto-optical ("MO") media. In the case of MO media a recording layer presents very stable magnetic domain states at room temperature. However, when a storage site is heated (e.g. by laser light energy) to a temperature beyond a characteristic temperature, known as the Curie temperature, all memory of a prior magnetization polarity or state is lost. As this site cools to below the Curie temperature it assumes a magnetization state determined by a residual magnetic field, usually supplied by an external bias electromagnet. One example of an optical flying head having an external bias electromagnet is provided by commonly assigned U.S. Pat. No. 5,105,408 to Lee et al., entitled: "Optical Head with Flying Lens", the disclosure thereof being incorporated herein by reference. In this prior approach the bias coil was formed as a printed microcircuit carried on a surface of the slider body facing the storage medium and having a central opening through which laser light energy passes from the lens While locating the coil in the manner described in U.S. Pat. No. 5,105,408 enables a field to be directed toward the storage site whose magnetic state is to be changed, the approach suffers from a number of drawbacks.

One drawback of this prior approach is that for a given driving current fully one half of the resultant magnetic field volume generated by the prior coil extended upwardly through the non-magnetic slider body and away from the storage medium. This condition uselessly added to the Amp*Turn requirement for a given magnetic field strength in the storage medium. Prior attempts at overcoming this drawback have been to provide multiple layers of thin-film coil windings, which adds further complexity and delicacy to an already complex and delicate manufacturing process. Another related drawback was that be cause the coil was inefficient in delivering flux at desired concentration to the storage medium, a higher driving current resulted in the generation of unwanted heat which results in undesirable thermal gradients within the head structure and may result in off-track operation of the optical drive mechanism. These drawbacks are overcome by the present invention.

SUMMARY OF THE INVENTION WITH OBJECTS

One object of the present invention is to provide a layer of nickel-iron alloy material directly between the coil and the slider body which reduces magnetic reluctance and increases flux density directed toward the storage medium in ways overcoming limitations and drawbacks of the prior art.

Another object of the present invention is to enable production and usage of a simpler-to-produce single layer thin f bias coil structure within a flying head assembly.

A further object of the present invention is to improve the thermal transfer characteristics of an optical flying head assembly having a thin film bias coil structure.

In accordance with one aspect of the principles of the present invention, a flying optical head assembly is provided for an optical data storage system including a magneto-optical data storage medium. The assembly has a slider body flexibly suspended above said medium on an air bearing, and an optical element mounted to the slider body and having a narrowed optical aperture extending through a location of the slider body. The slider body defines a recessed region surrounding the location passing the optical aperture. A magnetic pole sheet layer is formed in the recessed region and has an insulation layer and an opening for the optical aperture; and, a generally spiral magnetic bias coil is formed on the insulation layer and surrounding the narrowed optical aperture. The magnetic pole sheet layer desirably reduces magnetic reluctance and results in greater flux concentration reaching the magneto-optical data storage medium. Also, the magnetic pole sheet layer may include a thermally conductive material and thereby serve as a heat sink and spreader which spreads heat otherwise generated at the optical aperture/bias coil location (either in the coil or due to media or lens heating by the laser beam) more effectively than heretofore.

In accordance with a second aspect of the principles of the present invention, a flying optical head assembly is provided for an optical data storage system including a magneto-optical data storage medium. The assembly includes a slider body flexibly suspended above said medium on an air bearing, and an optical element mounted to the slider body and having a narrowed optical aperture extending through a location of the slider body. The slider body defines a region of ferromagnetic pole material surrounding the location passing the optical aperture. A thermally conducting heat spreading structure is attached to the slider body at the region and has an insulation layer and an opening for the narrowed optical aperture. A generally spiral magnetic bias coil is fixed on the insulation layer and surrounds the narrowed optical aperture.

In accordance with a third aspect of the principles of the present invention, an optical disk drive data storage system includes a flying optical head assembly for flying over a data storage surface of a rotating magneto-optical data storage disk upon an air bearing, and also includes a voice coil actuator and suspension assembly for positioning the flying optical head radially relative to the data storage surface. The flying optical head assembly has a slider body flexibly suspended above the disk on an air bearing and supports an objective lens and a light-direction-changing mirror assembly. A solid immersion lens optical element is mounted to the slider body and has a narrowed optical mesa extending through a location of the slider body in general alignment with a light path formed by the mirror assembly and the objective lens and further has a surface generally coplanar with air bearing surfaces of the slider body. The slider body defines a recessed region surrounding the location passing the optical mesa. A multi-layer magnetic pole-providing and heat-spreading structure is formed in the recessed region and has an outer insulation layer surrounding an opening for the narrowed optical aperture. A generally spiral magnetic bias coil is patterned and deposited onto the insulation layer and surrounds the narrowed optical aperture. In this aspect of the invention the multi-layer magnetic pole-providing and heat-spreading structure preferably comprises a first layer of nickel-iron alloy, a second layer of copper alloy, and a third layer of nickel-iron alloy, and further comprises a series of circumferentiauly spaced apart radial slots defined in the structure, and further comprises a bonding agent present in each slot for bonding the magnetic pole-providing and heat-spreading structure to the slider body and for reducing eddy currents and a single-turn short in close proximity to the magnetic bias coil.

These and other objects, advantages, aspects, and features of the present invention will be more fully appreciated and understood upon consideration of the following detailed description of preferred embodiments presented in conjunction with the accompanying drawings.

DETAILED DESCRIPTION OF PREFERRED EMBODIMENTS

Figure 1:
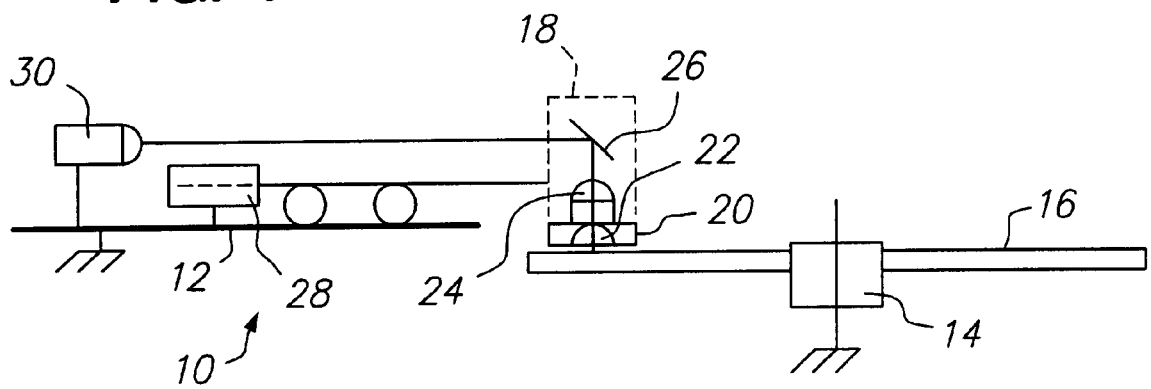
FIG. 1 is a highly diagrammatic view in elevation of an optical data storage device including a flying optical head assembly including a magnetic pole sheet layer in accordance with principles of the present invention.

Referring to FIGS. 1–4, where like characters designate like or corresponding parts throughout the views, an optical storage device 10 includes a base or frame 12, a spindle 14 which rotates at an angular velocity relative to the base 12, an optical data storage disk 16 mounted to the spindle 14, a flying optical head 18 including an air bearing slider body 20, a solid immersion lens (SIL) 22, an objective lens 24, and a mirror unit 26. A voice coil controlled actuator 28 shown diagrammatically as a linear actuator, but in practice either a rotary actuator or a linear actuator, controllably positions the flying optical head 18 relative to circular track locations defined on a confronting surface of the data storage disk 16. A solid state laser light source 30 generates coherent light energy and directs that light toward the mirror unit 26 of the flying optical head 18. Other elements including the optical data detection path and optical head position servo control path, are not shown because they are not particularly pertinent to an understanding of the present invention; however, these other elements, well understood by those skilled in the art, are present in the optical drive 10. In the presently preferred example, the optical drive 10 employs magneto-optical principles.

Figure 2:
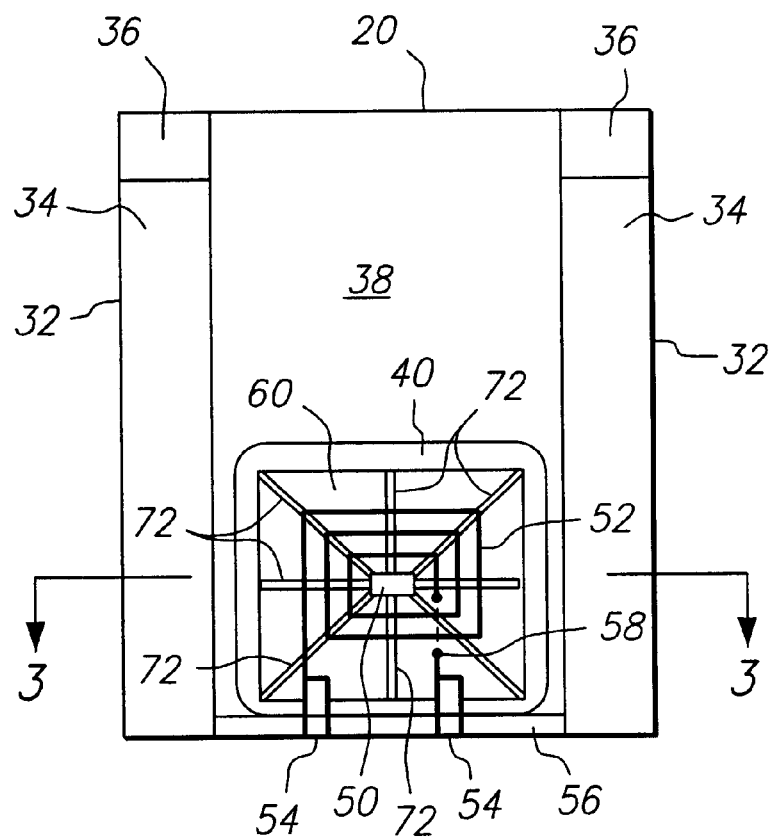
FIG. 2 is an enlarged air bearing surface plan view of the FIG. 1 flying optical head assembly showing a series of radially extending slots in the magnetic pole sheet layer of the FIG. 1 structure in order to promote attachment of the layer to the slider and to reduce eddy current losses in the magnetic pole structure.

Turning to FIG. 2, the slider body 20, preferably formed of a suitable hard ceramic material, such as aluminum oxide ceramic ($Al_2O_3$), includes e.g. two longitudinal rails 32 defining highly polished air bearing surfaces 34 and having slightly beveled regions 36 along a leading edge. The air bearing surfaces 34 may have known geometries and features such that the slider body 20 will have a controlled small flying height above a data storage surface of the disk 16 as the disk is rotated by the spindle 14 at a controlled angular velocity. (The surfaces 34 may be controlled to create a negative pressure, or a positive pressure, air bearing, as is well understood in the air bearing slider art).

A central region 38 of the slider body 20 between the rails 32 includes a recess 40 which may be suitably etched or otherwise formed to present a flat major surface generally parallel to the air bearing surfaces presented by the rails 32. A light portal or mesa 50 of a flying optical lens element, such as the SEL 22, extends through an appropriately sized and shaped opening of the slider body in a central part of the recess 40. The recess 40 may be rectangular or square, or it may be circular or have any other desired shape. The mesa 50 is an integral part of the SIL 22, and in one example is rectangular and has a longitudinal dimension (relative to slider body 20) of 42 $\mu$m (1.7 mils) and a transverse dimension of 75 $\mu$m (3 mils).

A magnetic bias coil 52 comprises at least one layer of thin film conductive metal deposition which has been suitably patterned and formed to surround the mesa 50 as a generally spiral continuous trace. The bias coil 52 connects to two widened terminal pads 54 which enable the coil 52 to be connected to external driver circuitry by connections made at a trailing edge of the slider body 20. A beveled region 56 may be formed adjacent the trailing edge to facilitate these electrical connections to an external electrical circuit.

A via and buried path structure 58 connect one of the pads to an inner end of the coil winding in conventional fashion. So far, the flying optical head assembly is conventional. It is conventionally suspended by a load beam, suspension assembly from the linear or rotary actuator 28, such that it may be precisely positioned at a storage track or location being followed for data writing or read back, and it may be displaced from a departure location to a destination location by a head positioning actuator assembly, also conventional, and not further described herein.

Figure 3:
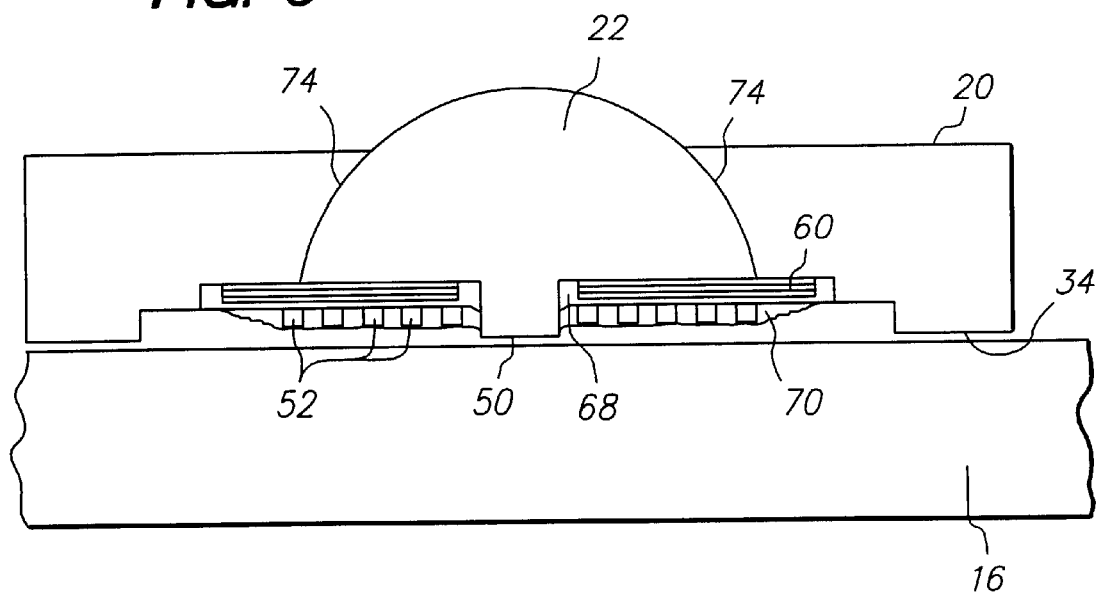
FIG. 3 is a greatly enlarged, diagrammatic view in end elevation and section (taken along line 3—3 in FIG. 2) of the FIG. 1 flying optical head assembly showing the magnetic pole sheet layer in relation to the slider body, lens, and bias coil structure.
Figure 4:
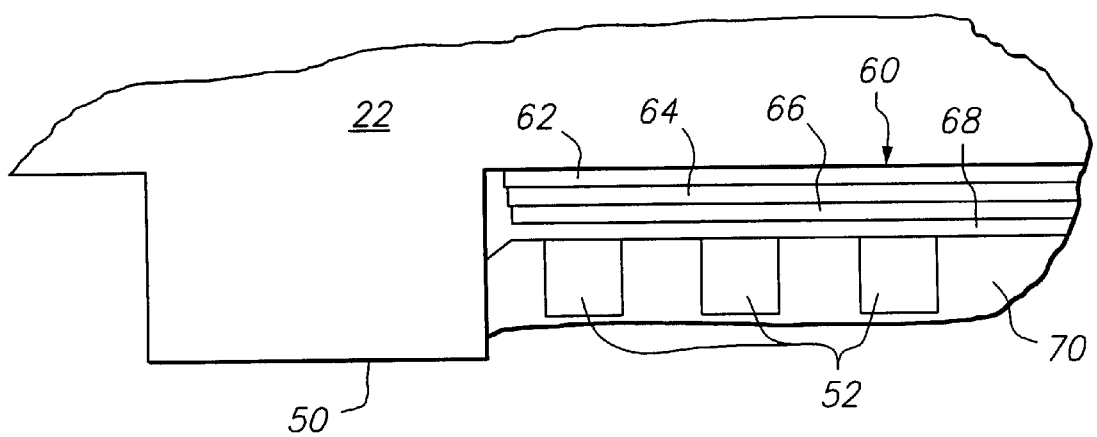
FIG. 4 is a greatly enlarged portion of the FIG. 3 view showing a laminar structure forming the magnetic pole sheet layer.

Returning to the slider body 20, in accordance with principles of the present invention a magnetic pole-forming sheet layer 60 is deposited directly to the slider body 20, or otherwise suitably attached to the slider body 20, within the recess 40, and occupies most of the space defined by the recess 40. As shown in FIGS. 3 and 4, the sheet layer 60 is preferably formed as a composite laminar deposition of a first layer 62 of nickel-iron alloy (NiFe), a second layer 64 of copper (Cu), and a third layer 66 of NiFe. An insulative and encapsulation layer 68, for example of aluminum oxide ($Al_2O_3$), is formed over the third layer 66 and exposed edges of layers 62 and 64. The turns of the coil 52 are deposited onto the encapsulation layer 68. Following formation of the turns of coil 52 a second encapsulation layer 70 may be deposited over the coil windings to protect them mechanically and from any oxidizing influences present in the operational ambient environment.

As shown in FIG. 2 the magnetic pole sheet layer 60 may be separated into radial sectors or segments by a pattern of radially extending narrow slots 72. While eight slots are shown in the FIG. 2 example, a greater number of slots is generally preferred, such as 16 or 24 slots, or more, depending upon the particular design, manufacturing capability and space available. These slots 72, if extended to the optical mesa 50, effectively reduce eddy currents otherwise generated within the magnetic pole sheet layer 60, and they also provide access points enabling the aluminum oxide encapsulation layer 68 to make a positive mechanical bond to the slider body 20 within the recess 40, thereby positively securing the magnetic pole sheet layer 60 to the slider body 20.

The SIL 22 having the light aperture or mesa 50 is secured in a suitably contoured recess defined in the slider body 20, as best shown in FIG. 3. A suitable bonding medium, such as low temperature glass, is emplaced and cured as a narrow layer 74 between the SIL 22 and the slider body 20. This layer 74 secures the SIL 22 to the slider body 20, and it also provides a heat conduction path for conducting heat generated within the SIL 22 by passage therethrough of a laser light beam having a suitable energy to erase/write a thin film MO storage medium formed in the rotating optical disk 16 shown in FIGS. 1 and 3 in close proximity to the ABS 34 of slider body 20 including optical mesa 50 of SIL 22.

By placing the sheet 60 of magnetic pole material above the bias coil 52, the reluctance at this part of the magnetic path is greatly reduced. The required number of amp-turns is nearly cut in half. (The gain would be precisely twice were there no opening for optical mesa 50). The required power with the same coil 52 with the magnetic pole sheet layer 60 is reduced by almost four times over a similar coil structure without the magnetic pole sheet layer 60. However, the inductance would be nearly doubled, so the inductive voltage spike is reduced by nearly times two (V=L(di/dt)=2 * 0.25=0.5).

A conventional two-layer coil structure can therefore be reduced to a single layer spiral coil, such as coil 52, which is simpler and more reliable to manufacture. In this event the net inductance is reduced by more than times two and the required driving current is slightly higher. The net power requirement (and consequent thermal load effect) is reduced by nearly one half over the prior two-layer design.

In addition to these performance advantages, the new head design can also be produced by following a more simplified process. It is easier to deposit a magnetic sheet layer 60 than it is to deposit and pattern a coil layer plus insulating layers above and below the coil. A simplified manufacturing process for forming the improved optical flying head includes the following steps:

A. Form the air bearing surface of the slider 20 including ABS surfaces 34 and the central portion 38.

B. Photo pattern and etch the recessed cavity region 40, and beveled region 56 for bonding pads 54 into the defined air bearing surface side of the slider 20.

C. Sputter deposit NiFe plating seed, photo pattern and plate the magnetic pole NiFe sheet layer 62 (two units thickness), the copper layer 64 (a single unit thickness) and the lower pole NiFe sheet layer 66 (two units thickness).

D. Sputter deposit the aluminum oxide insulating gap layer 68 (a single unit thickness).

E. Photo pattern and etch two electrical vias through the aluminum oxide layer 68 for interconnect bridge 58.

F. Deposit copper seed, photo pattern and plate the coil 52, electrical interconnection bridge 58, a coil centertap connection to the magnetic pole sheet layer, and the connection pads 54, and then sputter etch away the seed layer outside of the patterned coil, interconnect and pad areas.

G. Encapsulate the coil structure with the aluminum oxide layer 70 and then lap the structure flat and parallel with the ABS rails 32.

This approach includes a copper heat sink layer 64 in the center of the nickel-iron pole structure. This copper layer 64 will conduct heat out of the coil caused by the driving current, and heat out of the center region at the optical aperture 50 caused by laser heating of the media (and any heating of the SIL itself). Under certain circumstances it may be found desirable or necessary to "live" plate the nickel-iron and copper layers 62, 64 and 66. This means that the plating voltage is present while the slider wafer is inserted into a plating bath, so that the corrosive plating bath does not corrode away the previous layer before it becomes covered by the next layer. It should also be observed that the pole/heat sink structure 60 may be more readily deposited by sputtering through a metal mask or by sputtering layers followed by subsequent ion etching through a mask. These latter approaches produce sloped edges of the layers 62, 64 and 66 and turns of coil 52 which are more readily covered by the aluminum oxide encapsulation layer.

Other arrangements may be used which are within the spirit and scope of the present invention. For example, the slider body may be formed of a suitable ferromagnetic ceramic material such that the slider body provides the magnetic pole. In this case, the thermal spreading sheet structure 60 could be fabricated out of a suitable, thermally conductive, non-magnetic material, such as copper or aluminum. However, if an electrically conductive thermal spreading sheet layer is used, it is important to include at least one of the slots 72 to prevent a single shorting turn to be present in directly proximity to the coil 52, particularly in the case of high frequency bias currents needed for high speed writing.

Alternative magnetic materials may be used to form the sheet pole 60. One example is METGLAS™ amorphous magnetic alloy offered by Allied Signal Corporation. This particular material has excellent magnetic pole properties while presenting a high electrical resistance, thereby reducing the need for the eddy current, single turn eliminating slots 72. Also, those skilled in the art will appreciate that the sheet structure 60 may be formed as a discrete unit structure carrying the coil 52 and pads 54 with suitable insulating layers, such that the resultant unitary structure is bonded or otherwise suitably attached to the slider body 20 in the recess 40 by e.g. low temperature glass bonding techniques known in the art.

It is to be understood that the particular implementations described are intended as illustrations of, and not as limiting the scope of, the claims. It will of course be appreciated that in the development of any such actual implementation, numerous implementation-specific decisions must be made to achieve the developers' specific goals, such as compliance with system-related and business related constraints and that these goals will vary from one implementation to another. Moreover, it will be appreciated that such a development effort might be complex and time-consuming, but would nevertheless be a routine undertaking of engineering for those of ordinary skill having the benefit of this disclosure.

Although the present invention has been described in terms of the presently preferred embodiment, i.e., a flying optical head assembly having a magnetic pole sheet layer, it should be clear to those skilled in the art that the present invention may also be utilized in conjunction with, for example, a flying optical head assembly carrying forms of light paths and lenses other than a SIL. Thus, it should be understood that the instant disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A flying optical head assembly for an optical data storage system including a magneto-optical data storage medium, the assembly comprising:
    a unitary slider body flexibly suspended above said medium on an air beeaying,
    an optical element mounted to the slider body and having a narrowed optical aperture extending through a location of the slider body,
    the slider body defining a planarized recessed region surrounding the location passing the optical aperture, the planarized recessed region including
    a flux-enhancing magnetic pole-providing planar layer structure deposited in the planarized recessed region,
    an insulation layer deposited on the flux-enhancing planar layer structure
    the flux-enhancing planar layer structure and the insulation layer defining an opening for the narrowed optical aperture, and,
    a generally spiral magnetic bias coil deposited onto the insulation layer outwardly of the flux-enhancing magnetic pole-providing planar layer structure and confronting the magneto-optical data storage medium and surrounding the narrowed optical aperture.

2. The flying optical head assembly set forth in claim 1 further comprising an encapsulation layer of non-magnetic material formed over the generally spiral magnetic bias coil.

3. The flying optical head assembly set forth in claim 1 wherein the optical element comprises a solid immersion lens defining a mesa comprising the optical aperture.

4. The flying optical head assembly set forth in claim 1 wherein the flux-enhancing magnetic pole-providing planar layer structure comprises a plurality of layers, at least one of said layers comprising a ferromagnetic layer, and another one of said layers comprising a thermal spreading layer having a thermal conductivity greater than said ferromagnetic layer.

5. The flying optical head assembly set forth in claim 4 wherein said ferromagnetic layer comprises a nickel-iron alloy.

6. The flying optical head assembly set forth in claim 4 wherein said thermal spreading layer comprises copper.

7. The flying optical head assembly set forth in claim 1 wherein the magnetic bias coil is deposited onto the insulation layer as a single layer winding.

8. The flying optical head assembly set forth in claim 1 further comprising at least one radial slot defined in the flux-enhancing magnet pole-providing planar structure.

9. The flying optical head assembly set forth in claim 8 wherein the at least one radial slot extends across the flux-enhancing magnetic pole-providing planar stricture from the opening for the optical aperture to an outer edge thereof to avoid a single turn magnetic circuit in the flux-enhancing magnetic pole-providing planar structure.

10. The flying optical head assembly set forth in claim 8 further comprising a plurality of circumferentially spaced apart radial slots defined in the flux-enhancing magnetic pole-providing planar structure, such that the insulation layer extends through the structure at the slots and attaches to the slider body.

11. The flying optical head assembly set forth in claim 10 wherein the plurality of radial slots each extend from the opening for the optical aperture to an outer edge of the flux-enhancing magnetic pole-providing planar structure.

12. The flying optical head assembly set forth in claim 1 wherein the flux-enhancing magnetic pole-providing planar structure is deposited in the recessed region by sputter and plating deposition processes.

13. A flying optical head assembly for an optical data storage system including a magneto-optical data storage medium, the assembly comprising:
    a slider body flexibly suspended above said medium on an air bearing,
    an optical element mounted to the slider body and having a narrowed optical aperture extending through a location of the slider body,
    the slider body defining a region of ferromagnetic pole material surrounding the location passing the optical aperture,
    a thermally conducting heat spreading metal structure deposited onto the slider body at the region, having an insulation layer and an opening for the narrowed optical aperture, and, having at least one slot extending from the opening to a peripheral edge of the structure,
    a generally spiral magnetic bias coil deposited on the insulation layer and surrounding the narrowed optical aperture.

14. The flying optical head assembly set forth in claim 13 wherein the generally spiral magnetic bias coil is deposited as a single spiral winding layer on the insulation layer .

15. The flying optical head assembly set forth in claim 13 comprising a series of circumferentially spaced apart radial slots, and further comprising a bonding agent present in each slot for bonding the heat spreading structure to the slider body.

16. An optical disk drive data storage system including a flying optical head assembly for flying over a data storage surface of a rotating magneto-optical data storage disk upon an air bearing, the disk drive comprising a voice coil actuator and suspension assembly for positioning the flying optical head radially relative to the data storage surface of the disk, the flying optical head assembly comprising:
    a slider body flexibly suspended above said data storage disk on an air bearing and supporting an objective lens and a light direction changing mirror assembly,
    a solid immersion lens optical element mounted to the slider body and having a narrowed optical mesa extending through a location of the slider body and in general alignment with a light path formed by the mirror assembly and the objective lens and having a surface generally coplanar with air bearing surfaces of the slider body,
    the slider body defining a recessed region surrounding the location passing the optical mesa,
    a multi-layer magnetic pole-providing and heat spreading structure formed in the recessed region and having an outer insulation layer surrounding an opening for the narrowed optical aperture, and, a generally spiral magnetic bias coil patterned and deposited onto the insulation layer and surrounding the narrowed optical aperture.

17. The optical disk drive data storage system set forth in claim 16 wherein the multi-layer magnetic pole-providing and heat spreading structure comprises a first layer of nickel-iron alloy, a second layer of copper alloy, and a third layer of nickel-iron alloy, and further comprises a series of circumferentially spaced apart radial slots defined in the structure, and further comprises a bonding agent present in each slot for bonding the magnetic pole-providing and heat spreading structure to the slider body.

18. The flying optical head assembly set forth in claim 13 wherein the thermally conducting heat spreading metal structure comprises a plurality of layers of metal deposited onto the slider body, at least one of the layers comprising a ferromagnetic layer, and another one of said layers comprising a thermal spreading layer having a thermal conductivity greater than said ferromagnetic layer.

19. The flying height optical head assembly set forth in claim 18 wherein the ferromagnetic layer is comprised of a ferromagnetic nickel-iron alloy, and the thermal spreading layer is comprised of copper.

20. The flying optical head assembly set forth in claim 13 wherein the slider body comprises a ferromagnetic material and the thermally conducting heat spreading metal structure comprises a layer of material selected from a group of non-ferromagnetic metals, including aluminum and copper.

* * * * *